(12) United States Patent
Hofmann et al.

(10) Patent No.: US 12,736,421 B2
(45) Date of Patent: Sep. 15, 2026

(54) PIEZORESISTIVE FORCE SENSOR

(71) Applicant: DEUTSCHE INSTITUTE FÜR TEXTIL—UND FASERFORSCHUNG DENKENDORF, Denkendorf (DE)

(72) Inventors: Paul Hofmann, Illertissen (DE); Sarah Kim, Calw-Stammheim (DE)

(73) Assignee: DEUTSCHE INSTITUTE FÜR TEXTIL—UND FASERFORSCHUNG DENKENDORF, Denkendorf (DE)

( * ) Notice: Subject to any disclaimer, the term of this patent is extended or adjusted under 35 U.S.C. 154(b) by 1148 days.

(21) Appl. No.: 17/780,337

(22) PCT Filed: Nov. 13, 2020

(86) PCT No.: PCT/EP2020/082095
§ 371 (c)(1),
(2) Date: May 26, 2022

(87) PCT Pub. No.: WO2021/104899
PCT Pub. Date: Jun. 3, 2021

(65) Prior Publication Data
US 2022/0412818 A1 Dec. 29, 2022

(30) Foreign Application Priority Data
Nov. 26, 2019 (DE) ........................ 102019132028.3

(51) Int. Cl.
*G01L 1/18* (2006.01)
*G01L 1/20* (2006.01)

(52) U.S. Cl.
CPC ................ *G01L 1/18* (2013.01); *G01L 1/205* (2013.01)

(58) Field of Classification Search
CPC ................................ G01L 1/18; G01L 1/205
(Continued)

(56) References Cited

U.S. PATENT DOCUMENTS 2,845,962 A 8/1958 Bulgin
3,206,923 A 9/1965 Price
(Continued)

FOREIGN PATENT DOCUMENTS

CN 101748599 A 6/2010
CN 107142554 A * 9/2017 ............... G01L 1/22
(Continued)

OTHER PUBLICATIONS

JPO Notice of Reasons for Refusal corresponding to JP Application No. 2022-531039; Issue Date, Oct. 4, 2024.
(Continued)

*Primary Examiner* — Marrit Eyassu
(74) *Attorney, Agent, or Firm* — CANTOR COLBURN LLP

(57) ABSTRACT

A piezoresistive force sensor generates a sensor signal dependent on an amount of a force acting on the force sensor in a force measuring direction. The force sensor has a first electrode, a second electrode and an elastically deformable resistance layer electrically connects the two electrodes. A resistance value of a total resistance of an electrically conductive path between the electrode via the resistance layer changes according to the amount of the acting force. By measuring a voltage between the electrodes or a current flows along the electrically conductive path, a sensor signal is detected as the amount of the acting force. The resistance layer contains electrically conductive first staple fibers and electrically non-conductive second staple fibers. A proportion of the first staple fibers relative to the total quantity of
(Continued)

staple fibers is varied to adapt the force-resistance characteristic of the force sensor to the particular task.

18 Claims, 4 Drawing Sheets

(58) Field of Classification Search
USPC .................................................... 73/862.627
See application file for complete search history.

(56) References Cited

U.S. PATENT DOCUMENTS

| | | | | |
|---|---|---|---|---|
| 3,490,224 | A | 1/1970 | Bourgeas | |
| 3,699,590 | A | 10/1972 | Webber et al. | |
| 3,851,456 | A | 12/1974 | Hamada et al. | |
| 3,958,066 | A | 5/1976 | Imamura et al. | |
| 4,045,949 | A | 9/1977 | Paton et al. | |
| 4,129,677 | A | 12/1978 | Boe | |
| 4,216,264 | A | 8/1980 | Naruse et al. | |
| 4,267,233 | A | 5/1981 | Tanaka et al. | |
| 4,388,370 | A | 6/1983 | Ellis et al. | |
| 4,457,973 | A | 7/1984 | Matsui et al. | |
| 4,540,624 | A | 9/1985 | Cannady, Jr. | |
| 4,545,835 | A | 10/1985 | Gusack et al. | |
| 4,684,762 | A | 8/1987 | Gladfelter | |
| 4,704,311 | A | 11/1987 | Pickering et al. | |
| 4,756,969 | A | 7/1988 | Takeda | |
| 4,776,160 | A | 10/1988 | Rees | |
| 4,795,998 | A | 1/1989 | Dunbar et al. | |
| 4,813,219 | A | 3/1989 | Rees | |
| 4,943,477 | A | 7/1990 | Kanamura et al. | |
| 4,997,712 | A | 3/1991 | Lin | |
| 5,132,583 | A * | 7/1992 | Chang | G01D 5/14<br>310/357 |
| 5,260,013 | A | 11/1993 | Samuelson | |
| 5,262,234 | A | 11/1993 | Minor et al. | |
| 5,277,855 | A | 1/1994 | Blackmon et al. | |
| 5,368,913 | A | 11/1994 | Ortega | |
| 5,916,506 | A | 6/1999 | Breznak et al. | |
| 5,927,060 | A | 7/1999 | Watson | |
| 5,952,099 | A | 9/1999 | Asher et al. | |
| 6,346,491 | B1 * | 2/2002 | DeAngelis | D04H 1/43828<br>442/318 |
| 7,135,227 | B2 | 11/2006 | Karayianni et al. | |
| 7,845,153 | B2 | 12/2010 | Chung et al. | |
| 9,851,269 | B2 | 12/2017 | Ibrocevic et al. | |
| 10,173,924 | B2 | 1/2019 | Moireau et al. | |
| 2005/0170177 | A1 | 8/2005 | Crawford et al. | |
| 2007/0054577 | A1 | 3/2007 | Avloni | |
| 2017/0146413 | A1 | 5/2017 | Ibrocevic et al. | |
| 2017/0261388 | A1 * | 9/2017 | Ma | G01L 1/2287 |
| 2018/0018055 | A1 | 1/2018 | Li | |
| 2020/0180264 | A1 * | 6/2020 | Thostenson | G01M 5/0033 |

FOREIGN PATENT DOCUMENTS

| | | | | |
|---|---|---|---|---|
| DE | 1817235 | A1 | 7/1969 | |
| DE | 2251071 | B2 | 4/1973 | |
| DE | 2329484 | B2 | 12/1973 | |
| DE | 10006089 | A1 * | 8/2001 | B32B 25/04 |
| DE | 202006020401 | U1 | 7/2008 | |
| EP | 0250260 | B1 | 11/1991 | |
| EP | 0343496 | B1 | 8/1994 | |
| EP | 1362940 | A1 | 11/2003 | |
| EP | 1716085 | A1 | 11/2006 | |
| EP | 1961845 | A2 | 8/2008 | |
| EP | 1885925 | B1 | 10/2010 | |
| EP | 2236654 | B1 | 2/2012 | |
| JP | 2011137277 | A | 7/2011 | |
| JP | 2017134055 | A | 8/2017 | |
| JP | 2018111218 | A | 7/2018 | |
| JP | 2018124280 | A | 8/2018 | |
| JP | 2018179687 | A | 11/2018 | |
| KR | 100895092 | B1 | 4/2009 | |
| KR | 1020190037721 | A | 4/2019 | |
| WO | 03095724 | A1 | 11/2003 | |
| WO | 2004027132 | A1 | 4/2004 | |
| WO | 2008098386 | A1 | 8/2008 | |
| WO | 2009147114 | A1 | 12/2009 | |
| WO | 2012161197 | A1 | 11/2012 | |
| WO | 2015119211 | A1 | 8/2015 | |
| WO | 2018011001 | A1 | 1/2018 | |
| WO | 2018193135 | A1 | 10/2018 | |

OTHER PUBLICATIONS

English Translation of International Search Report for International Application No. PCT/EP2020/082095; Date of Completion: Feb. 17, 2021; Date of Mailing: Mar. 3, 2021; 2 Pages.

International Search Report for International Application No. PCT/EP2020/082095; Date of Completion: Feb. 17, 2021; Date of Mailing: Mar. 3, 2021; 5 Pages.

Written Opinion for International Application No. PCT/EP2020/082095; International Filing Date: Nov. 13, 2020; 6 Pages.

Translation of Written Opinion for International Application No. PCT/EP2020/082095; International Filing Date: Nov. 13, 2020; 6 Pages.

German Decision to Grant for German Application No. 102019132028.3 dated Dec. 23, 2020; 12 Pages.

* cited by examiner 25,27
29
28

15
20
M
17
21

F
20
15
M
17
21

PIEZORESISTIVE FORCE SENSOR

CROSS REFERENCE TO RELATED APPLICATIONS

This application is a National Stage of PCT Application No. PCT/EP2020/082095 filed on Nov. 13, 2020, which claims priority to German Patent Application No. 10 2019 132 028.3 filed on Nov. 26, 2019, the contents each of which are incorporated herein by reference thereto.

TECHNICAL FIELD

The invention refers to a piezo-resistive force sensor comprising a piezo-resistive resistance layer of textile material.

BACKGROUND

US 2007/0054577 A1 describes an electrically conductive textile material in form of a woven fabric or a non-woven fabric that can be used for construction of a pressure sensor. The textile material is pretreated for activation and for creation of usability for the application of a conductive layer. Subsequently a conductive coating is applied on the textile material layer by layer.

In such methods it is difficult to control the conductivity of the electrical resistance of the electrically conductive textile material. During coating by means of a solution, frequently the portion of conductive particles within the solution changes, such that during coating of the textile material parts a wide scattering occurs and also a high portion of non-usable electrically conductive textile material parts can be created.

Conductive fibers and their use in textile materials are known. For example, U.S. Pat. No. 2,845,962 describes anti-static textiles with a relatively high resistance per unit of area that contain electrically conductive carbon in order to be able to use the anti-static textile materials independent from the relative humidity in the environment.

EP 1 961 845 A2 discloses a melt-spun thread, wherein black carbon and graphite particles form aggregates along the longitudinal axis of the thread in order to create electrically conductive paths along the longitudinal axis of the thread.

U.S. Pat. No. 5,368,913 A describes an anti-static spunbonded non-woven fabric and a method for manufacturing thereof. Thereby multiple conductive carbon filaments and metallic filaments are laid into a non-electrically conductive non-woven fabric material during the production of the non-woven fabric.

An anti-static laminate with multiple layers is known from U.S. Pat. No. 4,540,624 A. Carbon fibers are arranged in the top layer for dissipation.

U.S. Pat. No. 6,346,491 B1 discloses a needle felt of woven fabric, knitted fabric or non-woven fabric. In different layers the needle felt comprises different conductivities, wherein the conductivity can be modified by means of the fiber density, the fiber diameter and the fiber conductivity. With the needle felt the electromagnetic interference shall be eliminated or reduced in different applications. Textiles for similar objects are, for example, also known from U.S. Pat. Nos. 4,684,762 A, 4,943,477 A and CN 101748599 B.

An anti-static garment is described in U.S. Pat. No. 3,699,590 A. A knitted yarn structure with conductor yarns of metallic material for use in RFID-labels is described in WO 2008/098386 A1.

EP 1 716 085 B1 discloses a conductive coating composition for a glass fiber as well as the manufacturing thereof in an emersion bath.

Moreover, it is known from a multiplicity of documents to manufacture compound yarns in which a textile carrier is combined with conductive threads, e.g. by winding, throwing, twisting or spinning. Such compound yarns are, for example, described in the following printed documents: U.S. Pat. Nos. 4,776,160 A, 4,813,219 A, 5,927,060 A, EP 1 885 925 B1, EP 3 484 730 A1, EP 2 300 649 A1, U.S. Pat. No. 7,135,227 B2, DE 20 2006 020 401 U1, WO 2004/027132 A1, DE 1 817 235 A, EP 0 250 260 B1, U.S. Pat. No. 3,851,456 A, KR 100895092 B1 or EP 2 236 654 B1.

In order to obtain a particularly high conductivity, WO 2003/095724 A1 and EP 1 362 940 A1 propose to provide yarns of metallic fibers for stainless steel fibers with a coating having high conductivity. U.S. Pat. No. 7,845,153 B2 discloses a method for manufacturing of conductive yarns from metal filaments, e.g. for the use of the yarns in the information communication.

Conductors and simple switches can be realized by means of conductive embroidery threads with high electrical conductivity, as it is for example described in JP 2011 137277 A or KR 10 201 903 7721 A.

In the field of conductive textiles a further group of documents refers to polymer fibers with conductive fillers and methods for manufacturing of such polymer fibers. By way of example the following documents are to be indicated: US 2005/0170177 A1, U.S. Pat. Nos. 4,457,973 A, 4,216,264 A, DE 2 329 484 B2, U.S. Pat. No. 5,952,099 A, EP 0 343 496 B1, U.S. Pat. Nos. 4,704,311 A, 5,260,013 A, 5,277,855 A, 4,545,835 A, 4,129,677 A, 4,997,712 A, 5,916,506 A, DE 2 251 071 B2, U.S. Pat. Nos. 4,045,949 A, 4,756,969 A, 5,262,234 A and 4,267,233 A.

U.S. Pat. No. 3,206,923 A proposes to guide a compound yarn with viscose in an emersion bath, whereby the emersion bath comprises carbon black particles. The viscose absorbs the carbon black particles.

BRIEF SUMMARY

Starting from the prior art it is the object of the present invention to create a force sensor. The force sensor shall have a configuration that can be produced in a simple and cheap manner with low scattering of the force sensor effect and that can particularly be configured for small forces as well as for great forces.

A piezo-resistive force sensor, including: an elastically deformable resistance layer that comprises a first outer surface and a second outer surface opposite the first outer surface and that comprises a mixture of distributed electrically conductive first staple fibers and electrically non-conductive second staple fibers, an electrically conductive first electrode and an electrically conductive second electrode, wherein the first electrode and the second electrode are either arranged on the first outer surface or the second outer surface such that an electrically conductive path is created from the first electrode via the resistance layer to the second electrode, wherein a resistance value of a resistance of the electrically conductive path depends on an amount of an external force that is effective between the first outer surface and the second outer surface.

A method for manufacturing a force sensor comprising the following steps: providing electrically conductive first staple fibers and electrically non-conductive second staple fibers, mixing the first staple fibers and the second staple fibers to a mixture in which the first staple fibers and the second staple fibers are distributed, forming from the mixture of an elastically deformable resistance layer comprising a first outer surface and a second outer surface that is opposite to the first outer surface, attaching an electrically conductive first electrode on the first outer surface or on the second outer surface and attaching an electrically conductive second electrode on the first outer surface or the second outer surface, such that an electrically conductive path is created from the first electrode via the resistance layer to the second electrode, wherein a resistance value of a electrical total resistance of the electrically conductive path depends on an external force applied between the first outer surface and the second outer surface.

The piezo-resistive force sensor according to the invention comprises an elastic deformable resistance layer. The resistance layer has a first outer surface and a second outer surface opposite the first outer surface. The two outer surfaces are arranged with distance in a direction in which the force sensor can detect a force acting from the outside and between the two outer surfaces, particularly a compressive force. The resistance layer comprises a mixture of electrically conductive first staple fibers and electrically non-conductive second staple fibers arranged spatially distributed. Preferably the resistance layer consists exclusively from the mixture of first and second staple fibers. Further components can be avoided.

In the resistance layer at least a portion or a number of first staple fibers abuts against one or more further first staple fibers respectively, such that an electrically conductive contact is established between these first staple fibers abutting against one another. This results in that one or multiple parallel conductive connections are created between the first outer surface and the second outer surface or are at least created during application of an external force. The number and/or the arrangement and/or the conductivity of the conductive connections, established due to the first staple fibers abutting against one another, can vary depending on the amount and the direction of the applied force.

Preferably the mixture of first and second staple fibers is substantially homogeneous, such that the density of first staple fibers and/or the density of second staple fibers in an observed volume portion of the mixture is substantially constant or is within a predefined tolerance range. The deviation of the density of first staple fibers and/or second staple fibers between observed volume portions of equal size within the entire mixture deviates preferably not more than 5% or not more than 10%. If the deviations of the density are within the indicated tolerance range, the mixture is considered as homogeneous mixture in the present application. The observed volume portion can have a size of minimum 1 $mm^3$ and/or of maximum 1 $cm^3$. Each volume portion of the resistance layer to be observed individually in terms of homogeneity can also be defined by an area with a size of minimum 1 $mm^2$ and/or maximum 1 $cm^2$ and can extend orthogonal to this area entirely between the first outer surface and the second outer surface through the resistance layer.

The mixture of first and second staple fibers can form a resistance layer in form of a non-woven fabric. Alternatively or additionally, one or more staple fiber yarns can be manufactured of first staple fibers and second staple fibers and can be present in the resistance layer as scrim and/or knitted fabric and/or warp-knitted fabric and/or woven fabric. Alternatively or additionally, one or multiple staple fiber twisted yarns can be manufactured from the described staple fiber yarns and can be present in the resistance layer as scrim and/or knitted fabric and/or warp-knitted fabric.

The staple fiber yarn can be a ring yarn, a rotor yarn, a friction yarn or an air jet yarn. The resistance layer can contain also an arbitrary combination of the indicated yarns. From an arbitrary combination of the indicated staple fiber yarns also a twisted yarn or wrapped yarn can be created, wherein the resistance layer can comprise at least one twisted yarn or wrapped yarn. Portions and/or compositions and/or components of the twisted yarn or wrapped yarn can be electrically non-conductive. For example, a twisted yarn can comprise one or more electrically non-conductive yarns.

The piezo-resistive force sensor also comprises an electrically conductive first electrode and an electrically conductive second electrode. Each electrode is either indirectly or directly arranged on the first outer surface or the second outer surface. In doing so, an electrically conductive path is established between the first electrode via the resistance layer to the second electrode or vice versa. The resistance value of the ohmic resistance of this path depends on an external force that is applied on the piezo-resistive force sensor. The force can be a compressive force or a tensile force, for example, by means of which the resistance layer is elastically deformed, such that the distance between the first outer surface and the second outer surface changes. The external force can have a force component (e.g. a vector component of a spatial vector) that urges the two outer surfaces away from or toward each other. For example, the detected force is the at least one force component that acts orthogonal or parallel to a plane on the piezo-resistive force sensor, wherein the plane is orientated substantially parallel to the two outer surfaces.

If in the present application a resistance is mentioned, always the ohmic resistance is meant as long as it is not indicated to the contrary.

Due to the construction of the force sensor having the elastically deformable resistance layer from electrically conductive first staple fibers and electrically non-conductive second staple fibers, the desired resistance value of the electrical path can be adjusted in a simple and cheap manner. By variation of the portion of the electrically conductive first staple fibers relative to the entire portion of first and second staple fibers, an adaption of the resistance value to the force range that shall be measured, can be carried out. The lower the amounts of the applied external forces are, the higher the portion of first staple fibers relative to the entire amount of first and second staple fibers.

The staple fibers are available on the market and can be purchased in a simple and cheap manner. The staple fibers can be processed to form a non-woven fabric, a yarn, a twisted yarn or the like, whereby the resistance layer can be made of non-woven fabric and/or at least one staple fiber yarn. For example, one or more staple fiber yarns can be connected with each other by means of weaving, knitting, warp knitting or the like and can be a component of the resistance layer or can form the resistance layer.

Preferably the portion of first staple fibers of the entire amount of first and second staple fibers is minimum 5%. It is further preferred that the portion of first staple fibers of the entire amount of first and second staple fibers is higher than 10% or 20%.

In a preferred embodiment the first staple fibers and/or the second staple fibers have a fiber length of at least 20 mm. Alternatively or additionally, the first staple fibers and/or the second staple fibers can have a fiber length of at most 100 mm.

In an embodiment the average fiber length of the first staple fibers and/or the average fiber length of the second staple fibers can amount to at least 20 mm and/or at most 100 mm.

The resistance layer has a volume resistance between the first and the second outer surface. The volume resistance within the resistance layer is formed by the contact resistances connected in parallel and/or in series to one another that are obtained by the first staple fibers that are in contact with one another.

It is further advantageous, if the total resistance of the electrically conductive path is defined from a series connection of multiple resistances. The series connection preferably comprises a first contact resistance between the first electrode and the resistance layer, a second contact resistance between the second electrode and the resistance layer as well as the volume resistance of the electrically conductive path inside the elastically deformable resistance layer or the total resistance consists of these indicated resistances. During application of an external force at least the volume resistance of the electrically conductive path inside the resistance layer changes and as an option or preferably, also the first contact resistance and/or the second contact resistance changes. In doing so, the sensitivity of the force sensor can be increased.

In a preferred embodiment the total resistance of the electrically conductive path amounts to maximum 1000 MΩ, if no external force acts on the force sensor. In addition or as an alternative, the value of the total resistance of the electrically conductive path during application of a force on the force sensor can amount to minimum 1 kΩ. It is advantageous, if the maximum value of the total resistance without application of an external force on the force sensor can be adjusted by means of the portion of first staple fibers relative to the entire portion of first and second staple fibers between 1 kΩ and 1000 MΩ.

It is advantageous, if the value of the total resistance of the electrically conductive path changes depending on an amount of the external force acting on the force sensor according to a defined correlation. The correlation is at least also defined by the portion of first staple fibers of the total amount of first and second staple fibers. Preferably this correlation is non-linear, but exponential, for example.

The correlation is at least also defined by the fiber type and/or the conductivity of the first staple fibers. For example, an operation range of the force sensor can be adjusted by means of the fiber type and/or the conductivity of the first staple fibers, particularly a maximum resistance value and/or a minimum resistance value and/or a gradient of a non-linear correlation between the resistance value of the total resistance and the external force.

It is advantageous, if the resistance value of the electrically conductive path reduces with increasing amount of the external force starting from a maximum resistance value. Preferably the resistance value can asymptotically approach to a minimum resistance value with increasing force at least in a range up to the maximum allowable external force. Preferably the operation range of the force sensor is the range starting with a minimum resistance value of the total resistance up to a resistance value of the total resistance in which the amount of the gradient of the non-linear correlation between the resistance value of the total resistance and the force exceeds a threshold.

In an advantageous embodiment the first staple fiber comprises multiple components, wherein at least one component thereof is electrically conductive. For example, the first staple fiber can comprise a polymer having an electrically conductive filler. For example, the first staple fiber can be configured as bi-component fiber. The bi-component fiber can comprise a core and an outer layer in an embodiment. The outer layer can jacket the core completely or partly. The outer layer contains electrically conductive material, particularly an electrically conductive filler, preferably electrically conductive carbon (e.g. so-called carbon black). The core of the bi-component fiber can be elastically deformable or can be neither plastically nor elastically deformable for the occurring forces. The core is preferably electrically non-conductive. The bi-component fiber can also comprise other configurations. Instead of a bi-component fiber the first staple fiber can also have a different configuration, for example: made of a polymer comprising an electrically conductive filler, comprising a core with a subsequently applied electrically conductive coating, etc.

For manufacturing of a force sensor, particularly a force sensor according to one of the embodiments described above, it can be proceeded as follows:

First, electrically conductive first staple fibers and electrically non-conductive second staple fibers are provided. The first and second staple fibers are subsequently mixed with each other to form a mixture such that preferably a homogeneous distribution of first and second staple fibers is present in the mixture. For mixing the first and second staple fibers, methods such as carding can be used.

Subsequently, an elastically deformable resistance layer is created by using the mixture. For this, the mixture can be felted or a staple fiber yarn or a twisted yarn made of multiple staple fiber yarns can be created from the mixture. The resistance layer can comprise a non-woven fabric and/or at least one staple fiber yarn and/or at least one twisted yarn made of staple fiber yarns. The staple fiber yarn or twisted yarn or the wrapped yarn can be connected with each other by means of weaving and/or knitting and/or warp knitting or the like. The non-woven fabric can be manufactured by solidifying the first and second staple fibers, e.g. by using of felting needles and/or water jets. Solidifying can also be carried out in addition or as an alternative by thermal application under addition of chemical substances.

On the resistance layer a first and second outer surface are present. An electrically conductive first electrode and an electrically conductive second electrode are attached to one of the outer surfaces respectively. In doing so, an electrically conductive path is established from the first electrode via the resistance layer to the second electrode or vice versa. The resistance value of this electrically conductive path of the produced force sensor depends on an external force applied in a tensile or compressing manner between the outer surfaces.

BRIEF DESCRIPTION OF THE DRAWINGS

Advantageous embodiments of the invention are derived from the dependent claims, the description and the drawings. In the following preferred embodiments of the invention are explained in detail based on the attached drawings. The drawings show:

DETAILED DESCRIPTION

Figure 1:
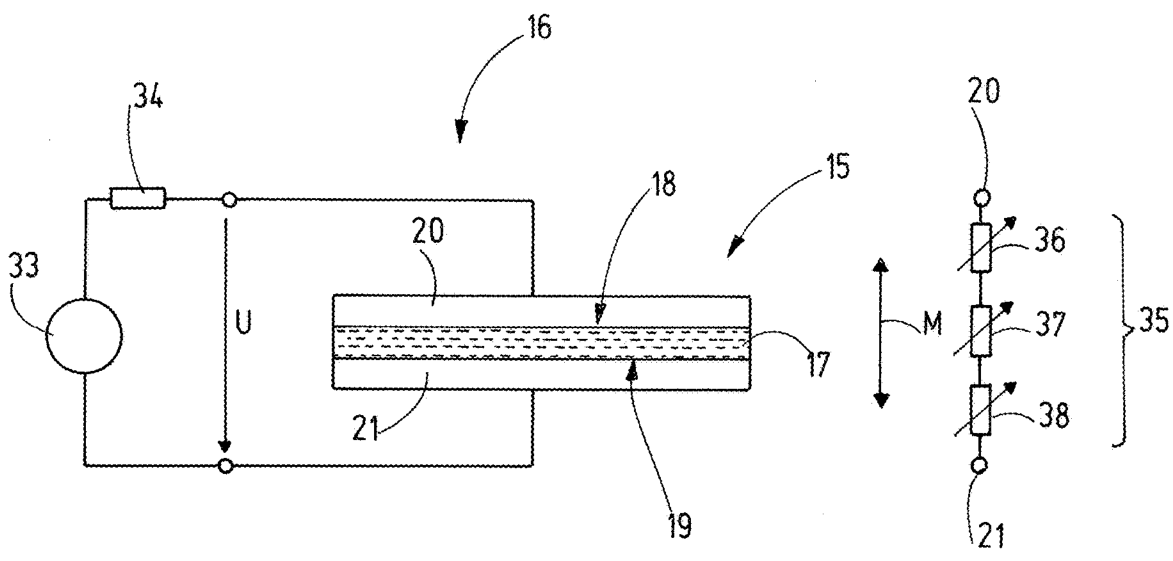
FIGS. 1 and 2 a schematic block-diagram-like illustration of a force sensor having a first electrode, a second electrode and an elastically deformable resistance layer as well as an equivalent circuit of the ohmic resistance of an electrical path, FIGS. 3-5 a schematic basic illustration of the construction of the resistance layer of first staple fibers and second staple fibers respectively as well as an assigned electrical equivalent circuit, FIG. 6 a schematic illustration in part of an embodiment of a first staple fiber in the form of an exemplary bi-component fiber, FIG. 7 a schematic basic illustration of the force sensor without force application, FIG. 8 the force sensor of FIG. 7 during application of an external force, FIG. 9 a diagram that illustrates the correlation between an electrical conductivity and the portion of first staple fibers in the resistance layer and FIG. 10 a diagram that illustrates the correlation between the resistance value of the electrically conductive path through the force sensor depending on the applied external force for different portions of first staple fibers.

In FIG. 1 a block diagram of a force sensor 15 and its connection into a circuit 16 is illustrated. The force sensor 15 comprises an elastically deformable resistance layer 17. The resistance layer 17 has a first outer surface 18 and an opposite second outer surface 19 facing away from the first outer surface 18. The two outer surfaces 18, 19 are arranged with distance opposite to each other in a force measuring direction M. According to the example, the force measuring direction M is substantially orientated orthogonal to a plane that is in turn orientated parallel to the outer surfaces 18, 19. Alternatively or additionally, the force sensor 15 can also detect forces of force components that are orientated parallel to this plane. The force sensor 15 can be a pressure sensor and/or tension sensor and/or strain sensor. Basically forces or force components can be measured that elastically deform the resistance layer 17 and particularly change the distance between the outer surfaces 18, 19.

The force sensor 15 has in addition a first electrode 20 and a second electrode 21. The two electrodes 20, 21 are indirectly mechanically and electrically connected with one another via the resistance layer 17 of the force sensor. A direct electrical connection between the two electrodes 20, 21 does not exist. Thus, a current can flow between electrodes 20, 21 only via the resistance layer 17.

In the embodiment according to FIG. 1 the first electrode 20 is attached to the first outer surface 18 and the second electrode 21 is attached to the second outer surface 19. The size of electrodes 20, 21 in a plane orthogonal to the force measuring direction M can be adapted to the size of the outer surfaces 18 or 19 of the resistance layer 17. The electrodes 20, 21 can also be smaller than the outer surfaces 18 or 19 of the resistance layer 17 to which they are attached respectively in at least one direction orthogonal to the force measuring direction M (FIG. 2).

Figure 2:
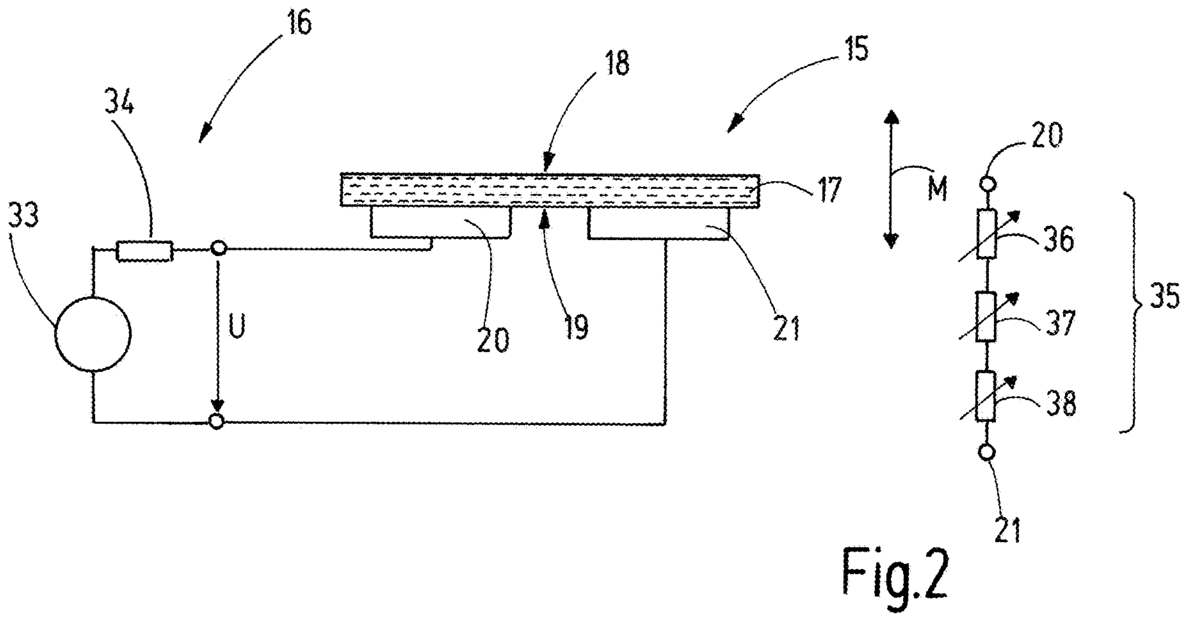

It is further apparent from the embodiment illustrated in FIG. 2 that the electrodes 20, 21 do not necessarily have to be arranged on opposite sides of the resistance layer 17. Rather the electrodes 20, 21 can also be attached commonly to the first outer surface 18 or—as illustrated—to the second outer surface 19 of the resistance layer 17.

The resistance layer 17 is electrically conductive and comprises a conductivity that is smaller than the conductivity of the two electrodes 20, 21. The electrodes 20, 21 can be made of a material comprising metal, for example. The electrodes 20, 21 can be attached to the resistance layer 17 by means of an electrically conductive adhesive bond, for example, for the attachment thereof.

Figure 3:
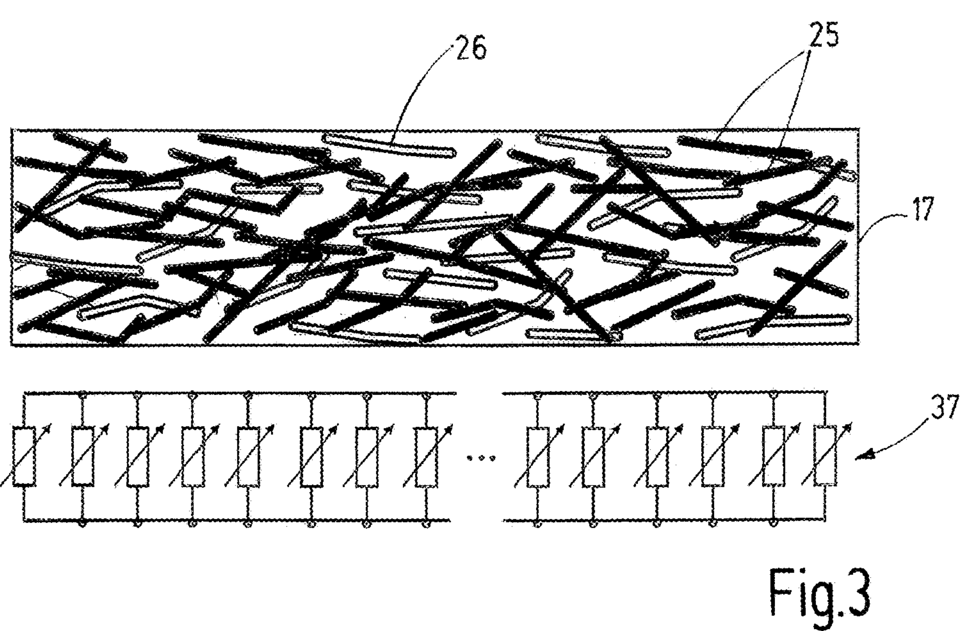
Figure 4:
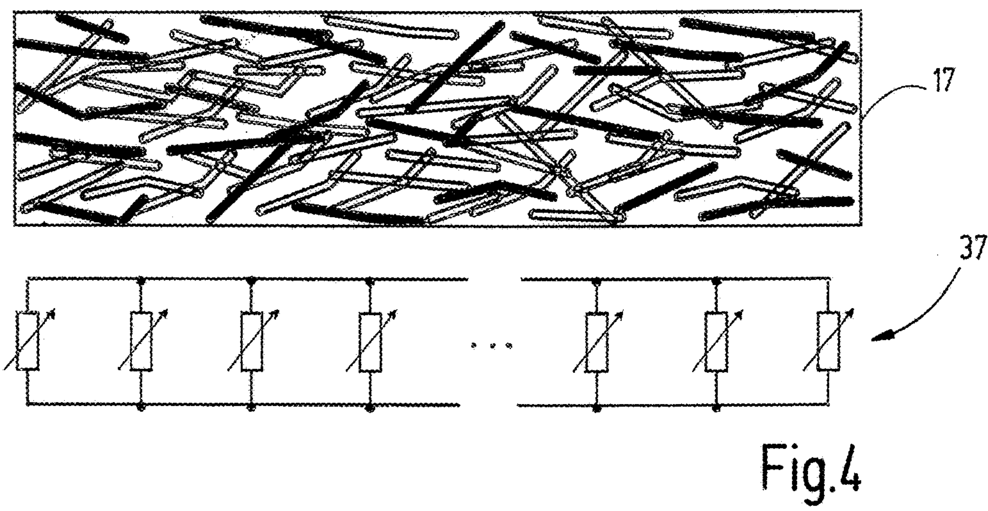
Figure 5:
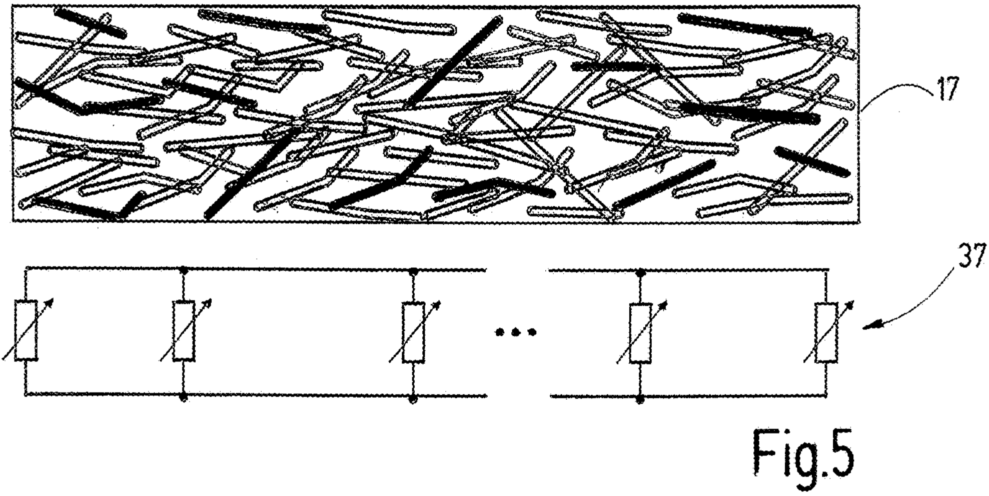

With reference to FIGS. 3-5 the construction of the resistance layer 17 is explained. The resistance layer 17 comprises a mixture from electrically conductive first staple fibers 25 and electrically non-conductive second staple fibers 26. In FIGS. 3-5 the electrically conductive first staple fibers 25 are illustrated in black, whereas the electrically non-conductive second staple fibers 26 are illustrated in white. The first staple fibers 25 and the second staple fibers 26 are substantially homogeneously distributed within the resistance layer 17. According to the example, this means that in each observed volume portion having a specific minimum size that extends, for example, in force measuring direction M from the first outer surface 18 up to the second outer surface 19 and that has a cross-section orthogonal to the force measuring direction M that is smaller than the first outer surface 18 and smaller than the second outer surface 19, the ratio of the number of first staple fibers 25 compared with the number of second staple fibers 26 is substantially equal. The deviation in the number of first staple fibers 25 and/or second staple fibers 26 or the ratio between two observed volume portions amounts preferably maximum 5% or maximum 10%. The volume portions have a constant cross-section in force measuring direction M. The cross-section area can be particularly about the factor 5 or 7 or 10 smaller than the first outer surface 18 and the second outer surface 19.

In the resistance layer 17 a number of first staple fibers 25 always abuts against one or multiple further first staple fibers 25, such that an electrically conductive contact between these first abutting staple fibers 25 is established. The arrangement or density of first staple fibers 25 is such that one or multiple parallel conductive connections are created between the first outer surface 18 and the second outer surface 18 or can be at least created during application of an external force. Thus, an electrically conductive connection exists between the two outer surfaces 18, 19 via the first staple fibers 25 having a variable volume resistance 37. The volume resistance 37 of the resistance layer 17 is defined in the equivalent circuit (FIGS. 3-5) by individual contact resistances connected in parallel and/or in series to one another that are established due to the first staple fibers 25 being in contact with each other. FIGS. 3-5 are only schematic in order to explain the principle of different portions of first staple fibers 25 and do not explicitly illustrate the electrically conductive connection between the two outer surfaces 18, 19.

For mixing first staple fibers 25 and second staple fibers 26 in order to achieve a homogeneous distribution within the resistance layer 17, the staple fibers 25, 26 can be distributed and orientated by means of carding, for example. The main extension direction of staple fibers 25, 26 according to the example is orthogonal to the force measuring direction M and preferably not parallel thereto. This means that more than 50% or more than 75% or more than 90% of first and second staple fibers have an extension component parallel to the force measuring direction M that is less than orthogonal to the force measuring direction M.

The resistance layer 17 is illustrated very schematically in the drawings. It can be configured as non-woven fabric and/or woven fabric and/or knitted fabric and/or warp-knitted fabric or the like. For example, the resistance layer 17 can comprise one or multiple staple fiber yarns and/or staple fiber twisted yarns that are connected with one another by means of weaving, knitting or warp knitting or that form a laid fabric. A staple fiber yarn can be realized as ring yarn, rotor yarn, friction yarn, wrapped yarn or air jet yarn.

In the embodiment the second staple fibers 26 consist of a plastic, preferably a polymer.

Figures 6, 7, 8:
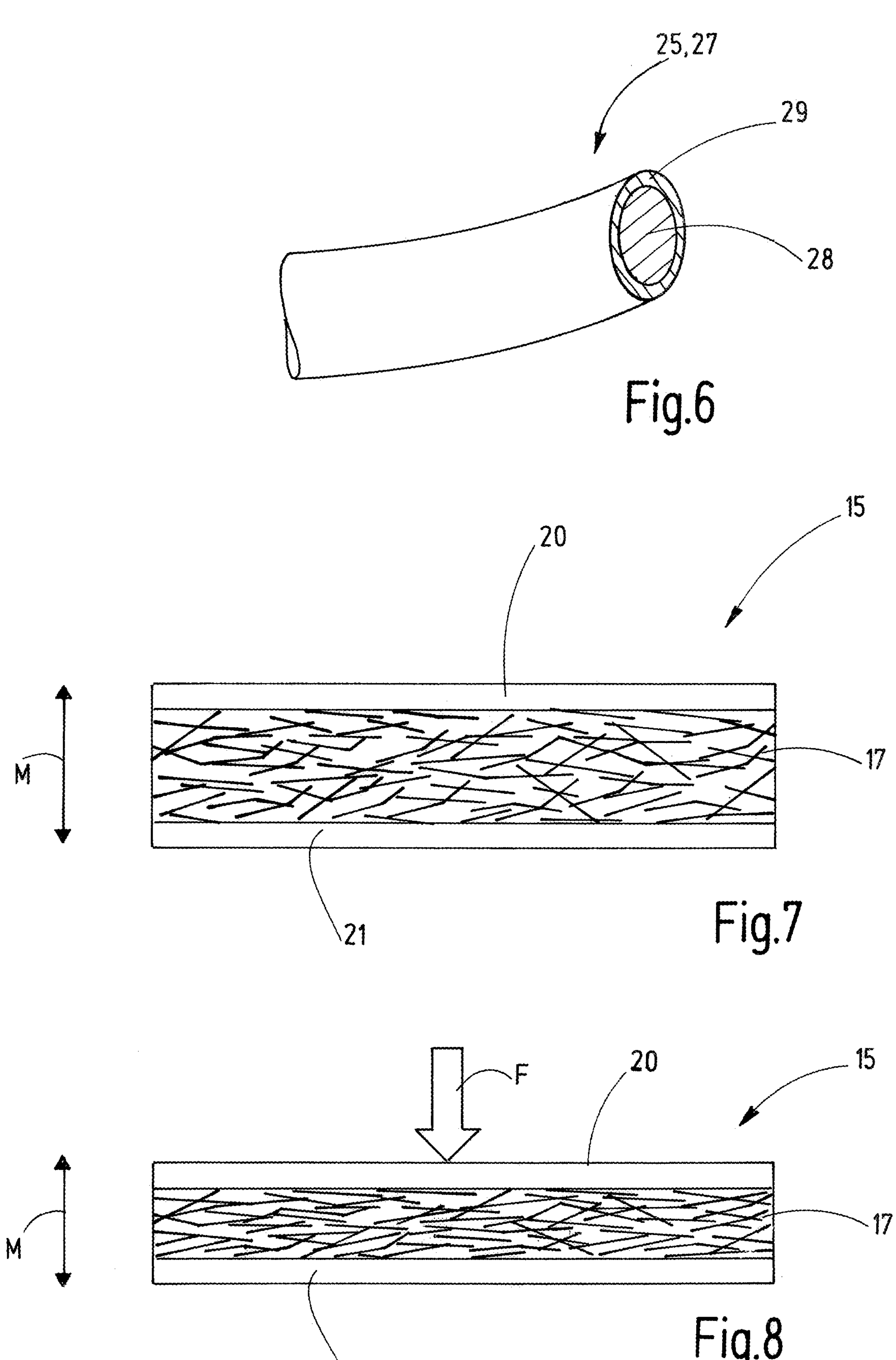
Figure 9:
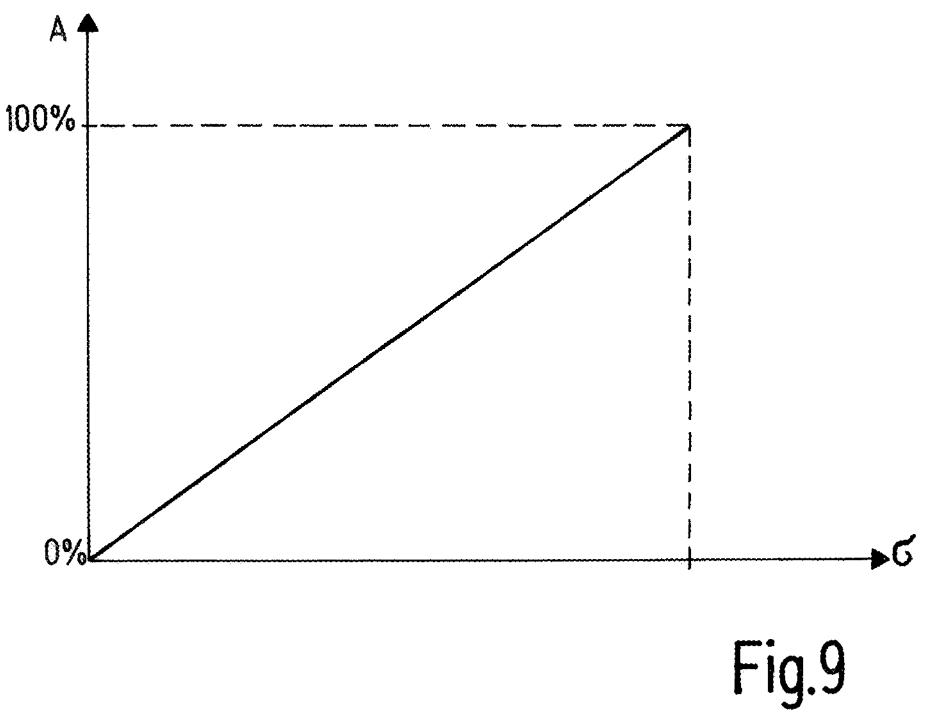

The first staple fibers 25 comprise electrically conductive material, particularly electrically conductive carbon, such as so-called "carbon black". The first staple fibers 25 can comprise in addition one or more non-electrically conductive components and can be configured as bi-component fibers 27, for example (FIG. 6). According to the example, the bi-component fiber 27 has a core 28 on which an outer layer 29 is applied entirely or partly. The core 28 is electrically non-conductive and can consist of a material that can be elastically deformed or that is elastically non-deformable for the occurring forces F, for example plastic, such as a polymer. The outer layer 29 comprises electrically conductive components, e.g. electrically conductive carbon. Also other configurations of the first staple fibers 25 are possible in which they comprise multiple components, at least one of which is an electrically conductive component. For example, the first staple fiber can comprise a polymer having an electrically conductive filler or can consist thereof.

The first staple fibers 25 and the second staple fibers 26 have a fiber length in the range of 20-100 mm in the embodiment.

In FIG. 7 the force sensor 15 is illustrated in its initial position or rest position in which it is not subject to an external force F. Due to the electrically conductive first staple fibers 25 in the resistance layer 17 that are in contact with one another, an electrically conductive path is created between the first electrode 20 via resistance layer 17 to the second electrode 21 or vice versa, such that a current is able to flow. If a force F is applied on the force sensor 15 (FIG. 8), the resistance value R of this electrically conductive path changes. If the force F is a force that compresses the force sensor 15 such that the first outer surface 18 and the second outer surface 19 are moved toward each other compared with the initial condition, the resistance value R of the electrically conductive path is reduced. Vice versa the resistance value R of the electrically conductive path would increase, if instead of a compressing force, a tensile force would be effective between the two outer surfaces 18, 19.

For measuring an external force F, e.g. a compressive force, a voltage or current source 33 can be electrically connected with the electrodes 20, 21 via a series resistor 34, as the circuits 16 illustrate in FIGS. 1 and 2. In doing so, a voltage U is applied between first electrode 20 and second electrode 21 that can be measured and that changes proportionally to the resistance value of the total resistance 35 of the electrically conductive path. The total resistance 35 of the electrically conductive path is composed in the embodiment of a series connection of multiple resistances: a first contact resistance 36 between first electrode 20 and resistance layer 17, the volume resistance 37 inside the resistance layer 17 along the created electrically conductive path as well as a second contact resistance 38 between the resistance layer 17 and second electrode 21. The resistance value R of the total resistance 35 therefore corresponds to the sum of the individual resistance values of this series connection. As schematically illustrated in the equivalent circuit in FIGS. 1 and 2, all of the resistances 36, 37, 38 of the series connection can be variable depending on the amount of the applied force F. At least the thickness or height of the elastically deformable resistance layer 17 changes in force measuring direction M during application of a force and thus the volume resistance 37 thereof.

The resistance value R of total resistance 35 of the electrically conductive path amounts in the initial condition of the force sensor 15, if no external force F is applied (FIG. 7) at most 1000 MΩ, for example. If a maximum external force F is applied on the force sensor 15 (FIG. 8) for which the force sensor 15 is configured or approved, the resistance value R of total resistance 35 of the electrically conductive path preferably amounts minimum 1 kΩ.

It is schematically apparent from FIGS. 3-5 and 9 that the portion A of first staple fibers 25 of the total amount of first staple fibers 25 and second staple fibers 26 can vary. The larger this portion A of first staple fibers 25 of the total amount of staple fibers 25, 26, the higher the conductivity δ of resistance layer 17 in force measuring direction M, that is preferably orthogonal to the outer surfaces 18, 19. By varying this portion A of first staple fibers 25, a desired conductivity δ of resistance layer 17 can be achieved. Thereby force sensor 15 can be adapted to different applications, e.g. in order to adjust a sufficient sensitivity depending from the range in which the amount of an external force F to be measured can be. If the range of the amount of the applied force F is very small, it can be reasonable to increase the conductivity δ of resistance layer 17 in the initial condition of the sensor by increasing a portion A of first staple fibers 25, which improves sensitivity for changes in case of smaller forces F. If forces F with high amounts shall be measured, the portion A of first staple fibers 25 can be selected to be smaller.

In FIGS. 3-5 resistance layers 17 having different portions A of first staple fibers 25 are schematically illustrated. The portion A is highest in FIG. 3 and lowest in FIG. 5. The higher the portion A of first staple fibers 25, the more parallel connected individual resistances exist in the equivalent circuit that form the volume resistance 37 within the resistance layer 17 along the electrically conductive path. This means that the volume resistance 37 within the resistance layer 17 is the lower in the initial condition of the force sensor 15 without application of an external force F, the higher the portion A of first staple fibers 25. This correlation is schematically illustrated only by exemplary illustrating equivalent circuits of the volume resistance 37 inside the resistance layer 17.

Figure 10:
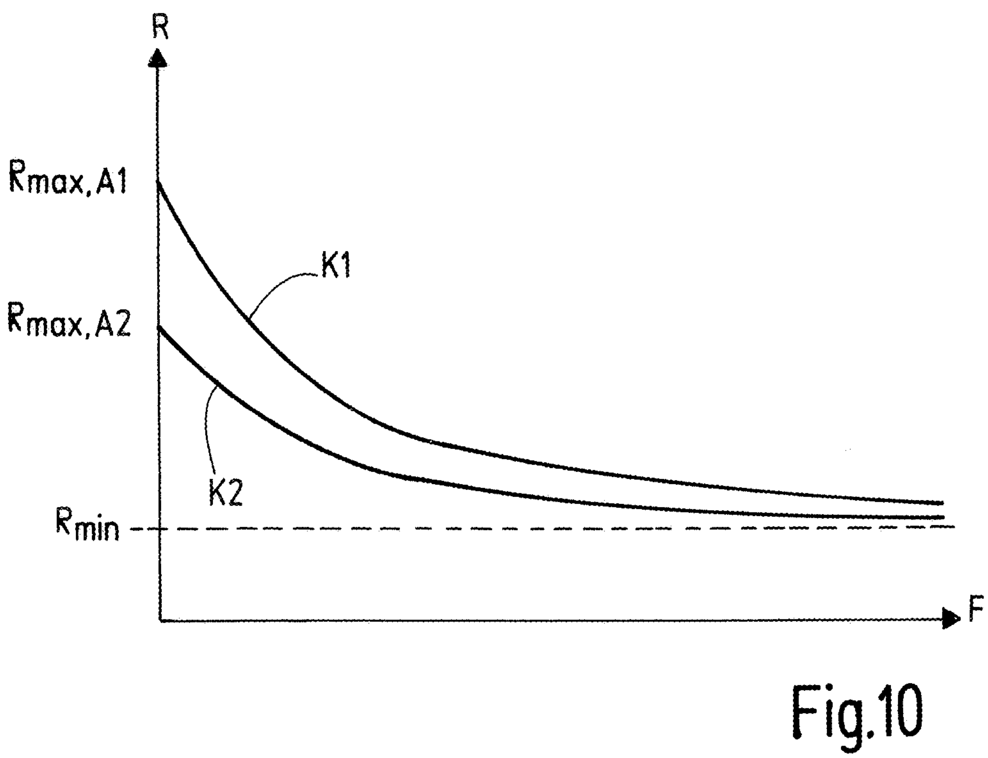

A correlation between the amount of an applied force F, e.g. a compression force, and the resistance value R of the total resistance 35 of the electrically conductive path is illustrated in FIG. 10 based on a first curve K1 and a second curve K2. The correlation is non-linear. If the applied force F is equal to zero, the force sensor 15 has a maximum value $R_{max}$ in its initial condition that in turn depends on the portion A of first staple fibers 25. The gradients of curves K1, K2 are higher in the range of smaller forces than in the range of greater forces. The curves K1, K2 can have an exponential progress and can approach asymptotically with increasing compressing force to a minimum value $R_{min}$ of resistance value R.

First curve K1 in FIG. 10 shows the correlation between an applied compressing force (force F) and the resistance value R in case of a first portion A1 of first staple fibers 25 and curve K2 shows this correlation in case of a second portion A2 of first staple fibers 25. Second portion A2 is greater than first portion A1. Without application of an external force F, the resistance value R has a maximum value $R_{max}$, the amount of which depends on portion A of first staple fibers 25. Thus, a suitable force-resistance-characteristic of the force sensor 15 adapted to the application can be achieved by varying the portion A of first staple fibers 25.

In general the correlation between amount of an applied force F and the resistance value R of the total resistance 35 of the electrically conductive path can be specifically influenced or adjusted by means of the following parameters:

The portion (A) of first staple fibers (25) of the total amount of first and second staple fibers (26) and/or the fiber type of first staple fibers (25) and/or
the conductivity of first staple fibers (25).

By means of one or more of the indicated parameters, the measurement range for the force F and/or the minimum resistance value $R_{min}$ and/or the maximum resistance value $R_{max}$ and/or the difference amount between the minimum resistance value $R_{min}$ and the maximum resistance value $R_{max}$ can be influenced or adjusted, for example.

The invention refers to a piezo-resistive force sensor 15 that is particularly configured as pressure sensor and that can create a sensor signal that depends on the amount of a force F that is applied on the force sensor 15 in a force measuring direction M. The force sensor 15 has a first electrode 20, a second electrode 21 and an elastically deformable resistance layer 17 that electrically connects the two electrodes 20, 21. A resistance value R of a total resistance 35 of an electrically conductive path between first electrode 20 via resistance layer 17 to the second electrode 21 changes dependent on the amount of the applied force F. Thus, a sensor signal can be detected that characterizes the amount of the applied force F, e.g. by measuring a voltage U between the electrodes 20, 21 or a current that flows along the electrically conductive path. The resistance layer 17 comprises electrically conductive first staple fibers 25 and electrically non-conductive second staple fibers 26. A portion A of first staple fibers 25 of the total amount of staple fibers 25, 26 can be varied in order to adapt the force-resistance-characteristic of the force sensor 15 to the respective application.

LIST OF REFERENCE SIGNS

15 force sensor
16 circuit
17 resistance layer
18 first outer surface
19 second outer surface
20 first electrode
21 second electrode
25 first staple fibers
26 second staple fibers
27 bi-component fiber
28 core
29 outer layer
33 voltage or current source
34 series resistor
35 total resistance of electrically conductive path
36 first contact resistance
37 volume resistance of electrically conductive path within the resistance layer
38 second contact resistance
A portion
F force
K1 first curve
K2 second curve
M force measuring direction
R resistance value of total resistance
$R_{max}$ maximum resistance value of total resistance
$R_{min}$ minimum resistance value of total resistance
U Voltage

The invention claimed is:

1. A piezo-resistive force sensor, comprising:

an elastically deformable resistance layer that comprises a first outer surface and a second outer surface opposite the first outer surface and that comprises a mixture of distributed electrically conductive first staple fibers and electrically non-conductive second staple fibers, an electrically conductive first electrode and an electrically conductive second electrode, wherein the first electrode and the second electrode are either arranged on the first outer surface or the second outer surface such that an electrically conductive path is created from the first electrode via the resistance layer to the second electrode, wherein a resistance value of a resistance of the electrically conductive path depends on an amount of an external force that is effective between the first outer surface and the second outer surface;

wherein a portion of the first staple fibers of a total amount of the first staple fibers and the second staple fibers is set to obtain a desired conductivity of the resistance layer in force measuring direction orthogonal to the outer surfaces, whereby the larger the portion of the first staple fibers of the total amount of the first staple fibers and the second staple fibers, the higher the conductivity of the resistance layer in the force measuring direction orthogonal to the outer surfaces;

wherein the resistance layer comprises a volume resistance depending from the external force that is created by individual contact resistances connected in parallel and/or in series to one another that are established at each contact site between two first staple fibers being in contact to one another; and wherein a total resistance of the electrically conductive path is created by a series connection of a first contact resistance between the first electrode and the resistance layer, a volume resistance of the electrically conductive path within the resistance layer and a second contact resistance between the resistance layer and the second electrode.

2. The piezo-resistive force sensor according to claim 1, wherein the first staple fibers and the second staple fibers are substantially homogeneously distributed in the resistance layer.

3. The piezo-resistive force sensor according to claim 2, wherein a portion of the first staple fibers of a total amount of the first staple fibers and the second staple fibers amounts to a minimum of 5%.

4. The piezo-resistive force sensor according to claim 3, wherein the portion of the first staple fibers of the total amount of the first staple fibers and the second staple fibers is higher than 20%.

5. The piezo-resistive force sensor according to claim 4, wherein the first staple fibers and/or the second staple fibers comprise a fiber length of 20-100 mm.

6. The piezo-resistive force sensor according to claim 1, wherein a portion of the first staple fibers of a total amount of the first staple fibers and the second staple fibers amounts to a minimum of 5%.

7. The piezo-resistive force sensor according to claim 6, wherein the portion of the first staple fibers of the total amount of the first staple fibers and the second staple fibers is higher than 20%.

8. The piezo-resistive force sensor according to claim 1, wherein the first staple fibers and/or the second staple fibers comprise a fiber length of 20-100 mm.

9. The piezo-resistive force sensor according to claim 1, wherein the resistance value of a total resistance of the electrically conductive path amounts to maximum 1000 MΩ, if no external force is applied on the force sensor.

10. The piezo-resistive force sensor according to claim 1, wherein a correlation is defined by means of a portion of the first staple fibers of a total amount of the first staple fibers and the second staple fibers and/or a fiber type of the first staple fibers and/or a conductivity of the first staple fibers, the correlation characterizing a change of the resistance value of a total resistance of the electrically conductive path depending on an amount of the external force acting on the force sensor.

11. The piezo-resistive force sensor according to claim 10, wherein the correlation is non-linear.

12. The piezo-resistive force sensor according to claim 10, wherein starting from a maximum resistance value the resistance value decreases and approaches asymptotically to a minimum resistance value with an increasing amount of the external force.

13. The piezo-resistive force sensor according to claim 1, wherein the first staple fibers are bi-component fibers.

14. The piezo-resistive force sensor according to claim 1, wherein the resistance layer comprises at least one staple fiber yarn comprising the first staple fibers and the second staple fibers that form a scrim and/or a woven fabric and/or a warp-knitted fabric.

15. The piezo-resistive force sensor according to claim 1, wherein the resistance layer comprises a non-woven fabric comprising the first staple fibers and the second staple fibers.

16. The piezo-resistive force sensor according to claim 1, wherein a portion of the first staple fibers of a total amount of the first staple fibers and the second staple fibers amounts to a minimum of 10%.

17. A method for manufacturing a force sensor comprising the following steps:

providing electrically conductive first staple fibers and electrically non-conductive second staple fibers, mixing the first staple fibers and the second staple fibers to a mixture in which the first staple fibers and the second staple fibers are distributed, forming from the mixture, an elastically deformable resistance layer comprising a first outer surface and a second outer surface that is opposite to the first outer surface, wherein a portion of the first staple fibers of a total amount of the first staple fibers and the second staple fibers is set to obtain a desired conductivity of the resistance layer in force measuring direction orthogonal to the outer surfaces, whereby the larger the portion of the first staple fibers of the total amount of the first staple fibers and the second staple fibers, the higher the conductivity of the resistance layer in the force measuring direction orthogonal to the outer surfaces, attaching an electrically conductive first electrode on the first outer surface or on the second outer surface and attaching an electrically conductive second electrode on the first outer surface or the second outer surface, such that an electrically conductive path is created from the first electrode via the resistance layer to the second electrode, wherein a resistance value of a total resistance of the electrically conductive path depends on an external force applied between the first outer surface and the second outer surface;

wherein the resistance layer comprises a volume resistance depending from the external force that is created by individual contact resistances connected in parallel and/or in series to one another that are established at each contact site between two first staple fibers being in contact to one another; and wherein the total resistance of the electrically conductive path is created by a series connection of a first contact resistance between the first electrode and the resistance layer, a volume resistance of the electrically conductive path within the resistance layer and a second contact resistance between the resistance layer and the second electrode.

18. A piezo-resistive force sensor, comprising:

an elastically deformable resistance layer that comprises a first outer surface and a second outer surface opposite the first outer surface and that comprises a mixture of distributed electrically conductive first staple fibers and electrically non-conductive second staple fibers, an electrically conductive first electrode and an electrically conductive second electrode, wherein the first electrode and the second electrode are either arranged on the first outer surface or the second outer surface such that an electrically conductive path is created from the first electrode via the resistance layer to the second electrode, wherein a resistance value of a resistance of the electrically conductive path depends on an amount of an external force that is effective between the first outer surface and the second outer surface, wherein a portion of the first staple fibers of a total amount of the first staple fibers and the second staple fibers is set to obtain a desired conductivity of the resistance layer in force measuring direction orthogonal to the outer surfaces, whereby the larger the portion of the first staple fibers of the total amount of the first staple fibers and the second staple fibers, the higher the conductivity of the resistance layer in the force measuring direction orthogonal to the outer surfaces, wherein the resistance layer comprises a volume resistance depending from the external force that is created by individual contact resistances connected in parallel and/or in series to one another that are established at each contact site between two first staple fibers being in contact to one another, wherein a total resistance of the electrically conductive path is created by a series connection of a first contact resistance between the first electrode and the resistance layer, a volume resistance of the electrically conductive path within the resistance layer and a second contact resistance between the resistance layer and the second electrode, and wherein the resistance value of a total resistance of the electrically conductive path amounts to maximum 1000 MΩ, if no external force is applied on the force sensor.

* * * * *